Figure 1:
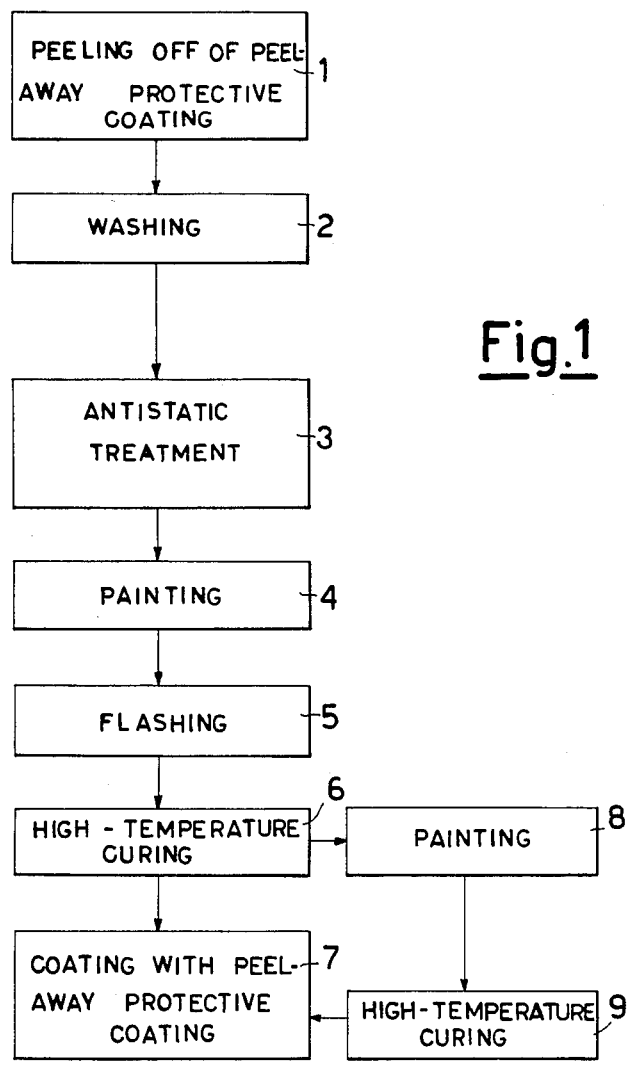

United States Patent [19]

Boccalon et al.

[11] Patent Number: 4,726,969
[45] Date of Patent: Feb. 23, 1988

[54] THERMOSETTING POLYISILOXANIC COMPOSITION FOR PROTECTIVE COATINGS AND PROCESS FOR COATING POLYCARBONATE SHEETS

[75] Inventors: Gianfranco Boccalon, Monterotondo; Alberto Tintinelli, Rome; Piero Carciofi; Mario De Antoniis, both of Monterotondo; Giuseppina Mazzamurro, Rome, all of Italy

[73] Assignee: Eniricherche, S.p.A., Milan, Italy

[21] Appl. No.: 24,603

[22] Filed: Mar. 11, 1987

[30] Foreign Application Priority Data

Mar. 27, 1986 [IT]  Italy ............... 19892 A/86
Mar. 27, 1986 [IT]  Italy ............... 19894 A/86

[51] Int. Cl.⁴ ............................................. B05D 1/18
[52] U.S. Cl. ................................. 427/393.5; 528/25;
528/33; 528/38; 427/54.1; 427/387; 427/430.1
[58] Field of Search ............... 427/430.1, 108; 528/25, 528/33, 38

[56] References Cited

U.S. PATENT DOCUMENTS

| | | | |
|---|---|---|---|
| 3,309,220 | 3/1967 | Osteen | 427/430.1 |
| 3,451,838 | 6/1969 | Burzynski et al. | 428/412 |
| 3,971,872 | 7/1976 | Le Boeuf | 427/430.1 |
| 4,017,556 | 4/1977 | Wang | 427/430.1 |
| 4,018,941 | 4/1977 | Tucker | 427/430.1 |
| 4,436,764 | 3/1984 | Nakazima et al. | 427/430.1 |

Primary Examiner—Thurman K. Page
Assistant Examiner—L. R. Horne
Attorney, Agent, or Firm—Hedman, Gibson, Costigan & Hoare

[57] ABSTRACT

A thermosetting organosiloxanic composition for protective coatings consists of a solvent and of the reaction product of four components, each one selected from one of following classes:
(a) aminoalkoxysilanes;
(b) formaldehyde or substances able to release formaldehyde;
(c) alkyl- or alkenyl-acyloxy-silanes;
(d) water;

and is obtained by interreacting metered amounts of (a) and (b) components, by operating in the absence of solvents or diluents, and, separately, metered amounts of (c) and (d) components, by operating in an alcoholic solvent, and then mixing together the two reaction products obtained.

Also a process is disclosed for polycarbonate sheets coating, by means of the above compositions.

9 Claims, 2 Drawing Figures

THERMOSETTING POLYISILOXANIC COMPOSITION FOR PROTECTIVE COATINGS AND PROCESS FOR COATING POLYCARBONATE SHEETS

The present invention relates to thermosetting organosiloxanic compositions for protective coating of polycarbonate. The invention relates also to a process for coating polycarbonate sheets, which uses said compositions.

Polycarbonate, even if is endowed with acceptable optical properties, good mechanical properties, such as impact strength and low specific gravity, cannot be used as a substitute for glass, because it has undesirable surface properties, such as poor abrasion strength, easy attack by solvents and, more generally, poor resistance to weather agents.

In order to obviate such drawbacks, and hence to be able to use such an organic polymer as a substitute for glass, many methods have been proposed. For example, in U.S. Pat. Nos. 3,458,342 and 3,522,080, some methods are described, according to which thin inorganic coatings, such as $SiO_2$, $Al_2O_3$, $ZrO_2$ are applied by vacuum-coating techniques.

But such methods require long times for a layer having sufficient abrasion strength (thickness at least higher than 1 micron) to be obtained.

Other methods use organofunctional silanes. For example, U.S. Pat. No. 3,451,838 describes the use of a composition constituted by a mixture of methyl-triethoxysilane and phenyl-triethoxy-silane, to coat policarbonate or polymethylmethacrylate; however, the resulting coating has a poor abrasion strength.

In U.S. Pat. No. 4,042,749 a composition is described, which is composed by reactive silanes and tetraalkyltitanates or tetraalkylzirconates.

The composition is then laid off on the substrates and cured by exposure to U.V. light, or by heating.

However, these composition suffer from the drawback that they must be used at once, pratically as soon as they are prepared, inasmuch as they are very sensible to moisture, and their storage may result problematical.

In European Patent Application publ. No. 146,995, compositions for coating, in particular for polycarbonate coating, are described, which are obtained by starting from an organo-alkoxy-silane, formaldehyde, a monocarboxylic organic acid and possibly an inorganic acid.

These compositions, although they are advantageous under various viewpoints, have not shown to be completely satisfactory in case of coatings of relatively high thickness and crosslinked to a high degree, i.e., able to show optimum values of abrasion strength, and of resistance to hydrolytic action by water.

It has been found now that the drawbacks of the prior art can be overcome by means of a thermosetting organosiloxanic composition able to coat polycarbonate with coatings endowed with high characteristics of evenness, adhesion, abrasion strength, and resistance to hydrolytic action by water, also at relatively high thicknesses. A simple and convenient process has also been found for the application of said composition to sheets of polycarbonate.

More particularly, the thermosetting organosiloxanic composition according to the present invention is the product of reaction of four components, each one being selected from one of following classes:

(a) amino-alkoxy-silanes, to be defined by the general formula (I):

wherein:
R is a $C_1$–$C_5$ linear or branched alkyl group;
m is an integer comprised within the range of from 1 to 5;
n is 0 or 1;

(b) formaldehyde, or a substance able to release formaldehyde;

(c) acyloxy-silanes, to be defined by the general formula (II):

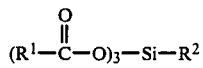

wherein:
$R^1$ is a $C_1$–$C_5$ linear or branched alkyl group;
$R^2$ is a $C_1$–$C_5$ linear or branched alkyl group, or a $C_2$–$C_5$ alkenyl group;

(d) water;

which is obtained by reacting (a) component with (b) component, in the absence of solvents or diluents, in such proportions that the ratio of formaldehyde moles of (b) component to the amino groups of (a) component: $HCHO/NH_2$, is comprised within the range of from 1.2/1 to 4.0/1, by operating at a temperature of from 22° to 70° C., until a clear solution is obtained; by furthermore separately interreacting (c) component with (d) component in an alcoholic solvent, with a ratio of water moles of (d) component to the number of acyloxy groups of (c) component within the ratio of from 0.1/1 to 0.66/1, by operating at least one hour at a temperature of from 5 to 30° C., and finally mixing the product of reaction of (a) and (b) components with the product of reaction of (c) and (d) components in such a way that the molar ratio between initially charged (c) and (a) components is comprised within the range of from 0.1/1 to 2.5/1, by operating at a temperature of from 15° to 30° C.

In the preferred form of practical embodiment, in general formula (I) of (a) component, R is a $C_1$–$C_2$ alkyl group and m has values of from 1 to 3. Examples of (a) component useful to the purpose are γ-aminopropyl-triethoxy-silane, aminoethyl-triethoxy-silane and 2-aminoethyl-aminopropyl-triethoxy-silane.

Always in the preferred form of embodiment, in general formula (II) of (c) component, $R^1$ is a $C_1$–$C_2$ alkyl group and $R^2$ is vinyl group. An example of (c) component is vinyl-triethoxy-silane.

Furthermore, as the (b) component, trioxane or paraformaldehyde (lower polymer of formaldehyde) can be used.

In particular, according to the instant invention, components (a) and (b) are reacted with each other with an $HCHO/NH_2$ ratio comprised within the range of from 1.2/1 to 4.0/1, by operating in the absence of solvents or diluents, and at temperatures of from 22° to 60° C. and preferably of from 32° to 52° C., until a clear solution is obtained. The times necessary for this reaction are shorter than 12 hours and are normally comprised within the range of from 2 to 6 hours.

Furthermore, according to the instant invention, components (c) and (d) are reacted with each other with a ratio of water moles to acyloxy groups comprised within the range of from 0.1/1 to 0.66/1, by operating in an alcoholic solvent, and at a temperature comprised within the range of from 5° to 30° C. The solvents suitable to the purpose are lower alifatic alcohols such as methanol, ethanol, butanol and isopropanol. The preferred reaction temperatures range from 15° to 22° C. The reaction times are generally comprised within the range of from 1 to 18 hours, and preferably of from 3 to 6 hours.

The two reaction products are then mixed with each other, by operating at a temperature of from 15° to 30° C. and preferably at a temperature of from 20° to 25° C., in such relative amounts that the molar ratio of (c) component to (a) component, as initially charged, is comprised within the range of from 0.1/1 to 2.5/1.

The so-obtained compositions can be used, after a possible dilution, to coat polycarbonate, in the form of sheets, films or other shaped manufactured articles, in particular flat or curved sheets and cellular sheets.

The so-coated articles are useful as windows, protective shields and, generally, articles of this type can be conveniently used in building, as well as in transportation industry.

The compositions are particularly suitable to the purpose of coating aromatic polycarbonate, i.e., poly(-diphenyl-2,2'-propane-carbonate) and can also be used on aliphatic polycarbonates, such as poly(diethylenegycolbis-allyl-carbonate).

At use time, the composition must be carefully filtered, so to remove any suspended particles, or possibly precipitates which might give rise to faults in coating.

The process of substrates coating can be conveniently performed by one of well-known varnish layingoff techniques, such as dip coating spray coating and still such techniques as flow coating, roll coating, spin coating.

In particular case of flat sheets, in particular of large-dimension flat sheets, optimum results are obtained by the coating procedure consisting of following sequential steps: peeling off of peel-away protection, washing, antistatic treatment, varnishing, drying, high-temperature curing and coating with peel-away protection.

In particular in varnishing step, the polycarbonate sheet is placed inside a varnishing tank, the tank is then filled, by bottom-feed, with the composition of the instant invention, until the sheets are completely covered by the composition, and finally the tank is emptied of composition.

In FIG. 1, the block diagram of the process is shown.

The polycarbonate sheets, provided with a protective peelable coating film on both of their faces, are fastened, by suitable fasteners, onto the overhead conveyor system.

They are then deprived of protective coating film (1), are washed (2), to the purpose of removing possible traces of bonding agents, and are then submitted to an antistatic treatment (3), to the purpose of neutralizing the antistatic charge generated during the peeling step.

The sheets are then brought, always by the overhead conveyor, on the vertical of varnishing tanks, and are lowered down inside the empty tank (4).

The tank is then filled and subsequently emptied. The sheets are then removed from the tank, and made rest in a drying station (5), wherein the volatile portion of the varnish evaporates, and the step of vitrification of applied layer begins.

The sheets are then submitted to high-temperature curing (6), during which the vitrification is completed and the adhesion-bonding of varnish coating to polycarbonate occurs. At curing end, the sheets are coated again with a protective peelable layer (7), in order to prevent abrasions due to possible contacts with mechanical devices; and allow the handling.

The sheets are finally stacked on each other and stored; the sheets exiting the oven and before being stored, can be possibly submitted to a further varnishing (8) with a top coat, which improves their characteristics of abrasion resistance, and then submitted again to a curing step (9).

PEELING AND ANTISTATIC TREATMENT

As it has already been said, the sheets are supplied as provided with a protective coating (generally polyethylene).

In the peeling bay, the sheets are placed on a roller conveyor, which positions them in a suitable position for them to be fastened onto the overhead conveyor line.

Once fastened, the sheets are manually deprived of their coating.

They undergo then a washing with alcohols or their mixtures (generally isopropanol) to the purpose of removing possible traces of bonding agents.

However, these steps can be eliminated, in case sheets without protective coating are available.

The sheets are then submitted to an antistatic treatment, for example, by a ionized air stream, produced by using antistatic bars installed is a special chamber (e.g., such as those manufactured by C.E.A.S.T.).

VARNISHING AND DRYING

The sheets are positioned on the vertical of the tank, and are lowered into the tank, with this latter being empty.

The tank is then filled and emptied, with a filling speed and an emptying speed comprised within the range of from 0.5 to 2 m/minute, and with the temperature inside the tank being kept constant at values comprised within the range of from 15° C. to 30° C., and preferably of from 20° C. to 22° C.

When exiting the tank, the sheets must stop for 5-30 minutes inside the drying station; here, the process of gelation and vitrification of the coating layer begins.

During the drying step, the evaporation occurs of most of solvent.

The varnishing and drying room shall be in communication with the cleaning room, by means of a tunnel, which allows the chamber to be physically bounded, in order to comply with most severe environmental specifications.

HIGH-TEMPERATURE CURING

The high-temperature curing step must take place at temperatures comprised within the range of from 100° to 135° C., with residence times longer than 90 minutes, generally not longer than 200 minutes.

The drying takes place in an oven.

Inside the oven, both the step of adhesion-bonding of primer coating to polycarbonate (6) and the step of adhesion-bonding of top coating on underlying primer (9) take place.

During this step, the vitrification process, begun in drying stations, is completed.

During the operation, much care must be taken in order to prevent that mechanical devices, which can abrade the sheet's surfaces, may come in contact with it.

COATING WITH PEEL-AWAY PROTECTIVE FILM

As it has already been said, upon exiting the oven, coating the sheets with a protective film is necessary.

This operation is carried out by a machine which, after a preliminary heating (50° C.) of the film (in general, a polyethylene film), directly applies the peel-away protection onto the polycarbonate.

The pressure exerted by the rollers is suitably controlled, so as not to deform the sheets.

The sheets, before being treated, must release the sensible heat accumulated inside the oven, up to reach their operating temperature.

ENVIRONMENT

In general, the characteristics of the environment inside which a processing is carried out, do not constitute a process parameter, but they supply, at best, some indications as to the safety criteria to be applied.

In our case, besides complying with the normal safety criteria as imposed by the presence of solvents, the need exists of operating in under controlled environmental conditions, inasmuch as the environment quality represents a true process parameter, prescinding from which is not possible.

In particular, very important are:

1. The absence of dusts; in fact, the possible presence of dust on polycarbonate surface would jeopardize to a considerable extent the good quality of end product, up to make it useless for the prefixed purposes; the working premises are requested to preferably comply with the regulations of a Class 100 clean room;

2. Air motion in varnishing chamber; it must be of laminar character, both in order not to induce perturbations in still wet varnish layer, and in order not to carry about possible dust traces; air motion must approach, as closely as possible, a piston-type motion directed from bottom upwards, with a speed lower than 0.5 m/second;

3. Presence of solvents in all plant sections: it requires an environment having explosion-proof (AD-PE) characteristics.

EXAMPLE 1

To a reactor of 2500 ml of capacity, equipped with stirring means and with means for heat exchange, thermoregulated at 32° C., charged is 952 g (4.3 mol) of γ-aminopropyl-triethoxy-silane ((a) component). With stirring, added are 477.3 of trioxane ((b) component), corresponding to 15.91 moles of formaldehyde. By so doing, the ratio of amino groups (in (a) component) to formaldehyde moles (in (b) component) is of 3.7/1. The temperature is progressively increased up to 52° C., and is maintained at this value over the next 90 minutes, so that a clear solution is obtained. At last, the reaction mass is cooled down to room temperature.

To a second reactor, of 7000 ml of capacity, thermoregulated at 22° C., introduced are 1184 g (5.1 mol) of vinyl-triacetoxy-silane ((c) component) and then 54.9 g (3.05 mol) of water ((d) component) in 1020 ml of ethanol. The ratio of water moles (in (d) component) to acetoxy groups (in (c) component) results thus of 0.55/1. Furthermore, the molar ratio of (c) component to (a) component results equal to 1.19/1.

The mixture inside reactor is maintained at 22° C. for about 110 minutes, and is then cooled to 5° C. The contents of first reactor is then slowly poured into the second reactor, kept cooled, within a 30-minutes time, so that the temperature of reaction mixture does not exceed 20° C.

At addition complete, the mixture is diluted with 2000 ml of ethanol and is kept stirred for three days.

The so-obtained composition ("A" composition) is filtered and used for coating polycarbonate specimens.

EXAMPLES 2-6

By following the same procedure as of Example 1, the compositions from "B" to "F" (this latter is a comparative composition) are prepared, with the ratio between components being varied. In particular, in following TABLE 1 the values are reported of the ratio of amino groups of (a) component to formaldehyde moles of (b) component ($HCHO/NH_2$); of the ratio of water moles in (d) component to acetoxy groups in (b) component ($H_2O$/acetoxy); and of the molar ratio of (c) component to (a) component ((c)/(a)).

TABLE 1

| EXAMPLE | 1 | 2 | 3 | 4 | 5 | 6 |
|---|---|---|---|---|---|---|
| Composition | A | B | C | D | E | F |
| $HCHO/NH_2$ | 3.7 | 2.8 | 3.0 | 2.5 | 1.6 | 0.6 |
| $H_2O$/acetoxy | 0.55 | 0.40 | 0.29 | 0.15 | 0.15 | 0.43 |
| (c)/(a) | 1.19 | 1.4 | 1.1 | 1.1 | 1.1 | 1.1 |

EXAMPLES 7-10

Specimens of SINVET ® Type 273 polycarbonate, of dimensions of 15 cm×15 cm×3 mm of thickness were coated on both of their surfaces with compositions "A", "D"–"F" as described in above Examples. All of samples showed a full adhesion of coatings to substrate, but a different behaviour for "F" Composition when the specimens were submitted to Duration Tests 1 and 2.

TEST 1

RESISTANCE TO WATER AT 80° C.

The specimen is heated to 60° C. inside in an oven, and in then vertically dipped inside a bath of distilled water, thermoregulated at 80° C.; the specimen is periodically inspected visually, until spontaneous delamination of coating occurs.

TEST 2

RESISTANCE TO ACETONE

Resistance to acetone has been evaluated by applying onto specimen surface a solvent-soaked cotton wad. 15 minutes later, the presence or less of attack spots is verified; in case no alterations have occurred, the test has been continued to a time of 30 minutes. The test is considered as being passed if after this time of contact with the solvent, no changes are observed in its surface.

The results are reported in TABLE 2.

TABLE 2

| Example | Compsition | Resistance to water at 80° C. (hours) | Resistance to acetone (minutes) |
|---|---|---|---|
| 7 | A | 25 | >30 |
| 8 | D | 15 | >30 |
| 9 | E | 10 | >30 |
| 10 | F | <1 hour | <15 |

EXAMPLES 11-14

"A", "D"–"F" Compositions were used to coat polycarbonate specimens of 15 cm×15 cm×3 mm of thickness, cutout from an extruded sheet of SINVET®, Type 273/01.

These specimens were laminated with polyvinylbutyral (PVB) bonding agent and an aluminum sheet, so to obtain multy-layer articles of polymer/organosiloxanic coating/PVB/aluminum type.

On these specimens, the tests of adhesion of polyvinylbutyral to the polymeric substrate were performed, with the results as reported in TABLE 3.

The adhesion test was performed as follows: on the multi-layer specimen a strip of 2.5 cm in thickness has been cutout throughout aluminum and PVB thickness; to this strip a static weight of 1 kg has been applied, so to exert a peeling action in a direction of 90° relatively to substrate.

The rate is measured, and is reported in TABLE 3, at which PVB peels away (the higher the rate, the lower the adhesion bond of PVB to substrate, in particular values higher than 1 indicate absence of adhesion).

However, in no cases chemical attacks with opacifying of PVB-coated polycarbonate was observed.

The not-coated polycarbonate is opacified by PVB and the adhesion strength results null.

TABLE 3

| Example | Composition | PVB Peeling Rate (mm/minute) |
|---|---|---|
| 11 | A | 0,030 |
| 12 | D | 0,133 |
| 13 | E | 0,068 |
| 14 | F | >1 |

EXAMPLE 15

To a reactor of 6 liters of capacity, thermoregulated at 32° C., 2700 g (12.2 mol) of aminopropyl-triethoxy-silane is charged.

With stirring, 1200 g trioxane (equivalent to 40 moles of formaldehyde) is added and allowed to react until the solution becomes completely clear. HCHO/NH$_2$ ratio results thus of 3.2/1.

Separately, to a second reactor, of 25 liters of capacity, there is charged 3300 g (14.2 mol) of vinyl-triacetoxy-silane; it is then pre-cooled to 10° C.

The silane is then reacted with 135 g (7.5 mol) of water diluted in 3 liters of ethanol, and is maintained at 22° C. for about 3 hours.

The ratio of water moles to acetoxy groups results thus equal to 0.17/1. Furthermore, the ratio of the second silane to the first silane is equal to 1.16/1.

The reactor is then cooled to 5° C.

The contents of first reactor is then slowly poured into the second reactor, in such a way that the temperature of the mixture never exceeds 20° C.

The mixture was then diluted with 7.5 l of isopropanol, is maintained stirred for 3 days and is then carefully filtered.

16 liters of varnish were thus obtained.

The preparation was repeated 3 times, so to obtain 48 liters of varnish, to be used to feed the plant as described in Example 2.

EXAMPLE 16

The varnish of Example 15 was used to coat sheets of SINVET® Type 273/01 polycarbonate, of dimensions of 1050 mm×500 mm and of 6 mm in thickness.

Figure 2:
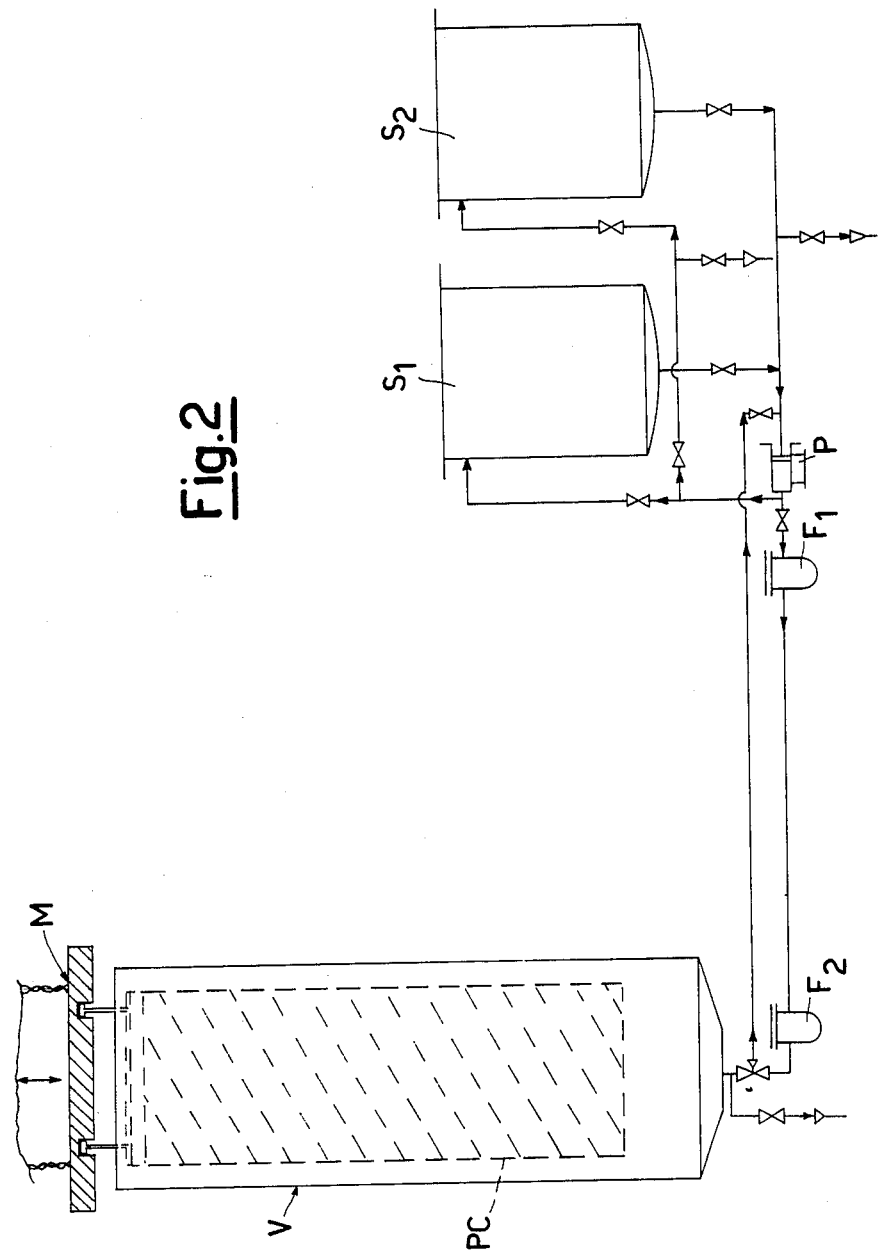

The plant used is schematically shown in FIG. 2, wherein:
S1=varnish containing tank
S2=solvent containing tank
P=circulation pump
F1, F2=filters
V=varnishing tank
PC=polycarbonate sheet
M=overhead sheet hanging and conveyance system The varnishing operation has been carried out with the following steps:
(1) plant washing, by using the solvent contained in S2;
(2) positioning, by M, of PC sheet inside empty V tank;
(3) filling of tank V by means of varnish contained in S1, via F1,F2 line;
(4) emptying of tank V, with fluid level sinking speed of about 1 meter/minute;
(5) mechanical extraction of PC sheet (and high-temperature curing thereof according to steps 5, 6 and 7 of FIG. 1);
(6) plant solvent-washing.

The coatings obtained with this composition resulted to have an average thickness of 6 microns.

EXAMPLE 17

The characteristics of the sheets coated according to as described in Example 16 were tested by checking their transmittance in the visible range, their resistance to solvents, and their abrasion resistance.

The results are reported in Table 4, as compared to those of uncoated polycarbonate.

TABLE 4

| Material | T (%)[1] | Resistance to Gasoline[2] (seconds) | Abrasion Strength[3] ΔH (%) at 100 cycles |
|---|---|---|---|
| Coated SINVET® PC | 91 | Gasoline-resistant | 3.6 |
| Uncoated SINVENT® PC | 91.8 | 20 | >40 |

[1]The transmittance was measured at λ = 500, nm by using a Perkin-Elmer Spectophotometer, Model 356;
[2]This test consists in measuring the time necessary for surface cracks to appear on tensioned PC specimen, with its surface being wetted with a gasoline;
[3]Abrasion strength was determined according to ASTM D1044 Standard by means of a Taber Abrasion Meter, by using CS-10F grinding wheels loaded with 500 g, the increase in Haze (ΔH %) after 100 cycles being measured by a Gardener Haze-Meter.

We claim:
1. Thermosetting organosiloxanic composition constituted by the product of reaction of four components, each one being selected from one of the following classes:
(a) amino-alkoxy-silanes, to be defined by the general formula (I):

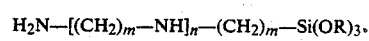

$$H_2N-[(CH_2)_m-NH]_n-(CH_2)_m-Si(OR)_3,$$

wherein:
R is a C$_1$–C$_5$ linear or branched alkyl group;
m is an integer of from 1 to 5;

n is 0 or 1;

(b) formaldehyde, tiroxane or paraformaldehyde formaldehyde;

(c) acyloxy-silanes, to be defined by the general formula (II):

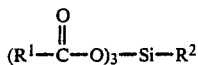

wherein:

$R^1$ is a $C_1$–$C_5$ linear or branched alkyl group;

$R^2$ is a $C_1$–$C_5$ linear or branched alkyl group, or a $C_2$–$C_5$ alkenyl group;

(d) water;

which is obtained by reacting (a) component with (b) component, in the absence of solvents or diluents, in such proportions that the ratio of moles of formaldehyde of (b) component to the amino groups of (a) component of directly from 1.2/1 to 4.0/1, by operating at a temperature of from 22° to 70° C., until a clear solution is obtained; by furthermore separately making (c) component interreact with (d) component in an alcoholic solvent, with a ratio of water moles of (d) component to the number of acyloxy groups of (c) component within the range of from 0.1/1 to 0.66/1, by operatiang at least one hour at a temperature of from 5° to 30° C., and finally mixing the product of reaction of (a) and (b) components with the product of reaction of (c) and (d) components in such a way that the molar ratio between initially charged (c) and (a) components is comprised within the range of from 0.1/1 to 2.5/1, by operating at a temperature of from 15° to 30° C.

2. Composition according to claim 1, wherein in general formula (I) of (a) component, R is a $C_1$–$C_2$ alkyl group, and m has a value of from 1 to 3.

3. Composition according to claim 2, wherein said (a) component is selected from γ-aminopropyl-triethoxysilane, aminoethyl-triethoxy-silane, and 2-aminoethylaminopropyl-triethoxysilane.

4. Composition according to claim 1, wherein in general formula (II) of (c) component, $R^1$ is a $C_1$–$C_2$ alkyl group and $R^2$ is vinyl group.

5. Composition according to claim 4, wherein (c) component is vinyl-triacethoxy-silane.

6. Composition according to claim 2, wherein (b) component is selected from trioxane and paraformaldehyde.

7. Composition according to claim 1, wherein (a) and (b) components are reacted at temperatures of from 32° to 52° C. for a time of from 2 to 6 hours.

8. Composition according to claim 1, wherein (c) and (d) components are reacted by operating in a solvent constituted by methanol, ethanol, butanol or isopropanol, at a temperature of from 15° to 22° C. and for a time of from 3 to 6 hours.

9. A process for coating polycarbonate sheets, comprising:

positioning a polycarbonate sheet inside a painting tank, placing the composition according to any one of claims 1 to 8 inside the tank to fill up and to completely cover said sheet, subsequently emptying the tank of said composition, and advancing the coated sheet to a drying station, followed by curing at a temperature of 100° to 135° C. for at least 90 minutes.

* * * * *